United States Patent
Kanakasabai et al.

(10) Patent No.: US 8,624,431 B2
(45) Date of Patent: Jan. 7, 2014

(54) SYSTEM AND METHOD FOR POWER SHARING OF FRONT-END CONVERTERS WITHOUT COMMUNICATION LINK IN A MODULAR-STACKED DC TRANSMISSION SYSTEM

(75) Inventors: Viswanathan Kanakasabai, Bangalore (IN); Pradeep Vijayan, Bangalore (IN); Bhaskar Sen, Bangalore (IN)

(73) Assignee: General Electric Company, Niskayuna, NY (US)

( * ) Notice: Subject to any disclaimer, the term of this patent is extended or adjusted under 35 U.S.C. 154(b) by 390 days.

(21) Appl. No.: 13/035,936

(22) Filed: Feb. 26, 2011

(65) Prior Publication Data

US 2012/0217802 A1    Aug. 30, 2012

(51) Int. Cl.
*H02J 3/14* (2006.01)
(52) U.S. Cl.
USPC .......................................................... 307/32
(58) Field of Classification Search
USPC ............ 307/31–32, 53–59, 82, 103; 323/266, 323/268, 271; 363/65, 67–68, 71
See application file for complete search history.

(56) References Cited

U.S. PATENT DOCUMENTS 7,567,064 B2 *   7/2009   Ponnaluri et al. ............. 323/207
7,577,006 B2     8/2009   Neacsu
8,237,423 B2 *   8/2012   Heineman et al. ............ 323/283
2009/0279328 A1  11/2009  Jiang-Hafner
2010/0133901 A1 *  6/2010  Zhang et al. .................... 307/11

FOREIGN PATENT DOCUMENTS

EP   2194638 A2      6/2010
EP   2270969 A1 *   1/2011
EP   2270969 A1 *   1/2011

OTHER PUBLICATIONS

Search Report and Written Opinion from corresponding PCT Application No. PCT/US2012/026332 dated Jun. 29, 2012.

* cited by examiner

*Primary Examiner* — Rexford Barnie
*Assistant Examiner* — Rasem Mourad
(74) *Attorney, Agent, or Firm* — Andrew J. Caruso

(57) ABSTRACT

A sub-sea power transmission/distribution network includes a plurality of standard proven power converter building blocks on each of the power source side and the sub-sea load side. The power source side converters and the sub-sea load side converters are each configured to provide a modular stacked dc (MSDC) converter architecture. The power source side converters are further configured to share the load equally or in proportion to their individual power ratings. The configurations are based on corresponding droop curves representative of MSDC link current magnitude data and average output voltage data of the power source side converters.

10 Claims, 6 Drawing Sheets

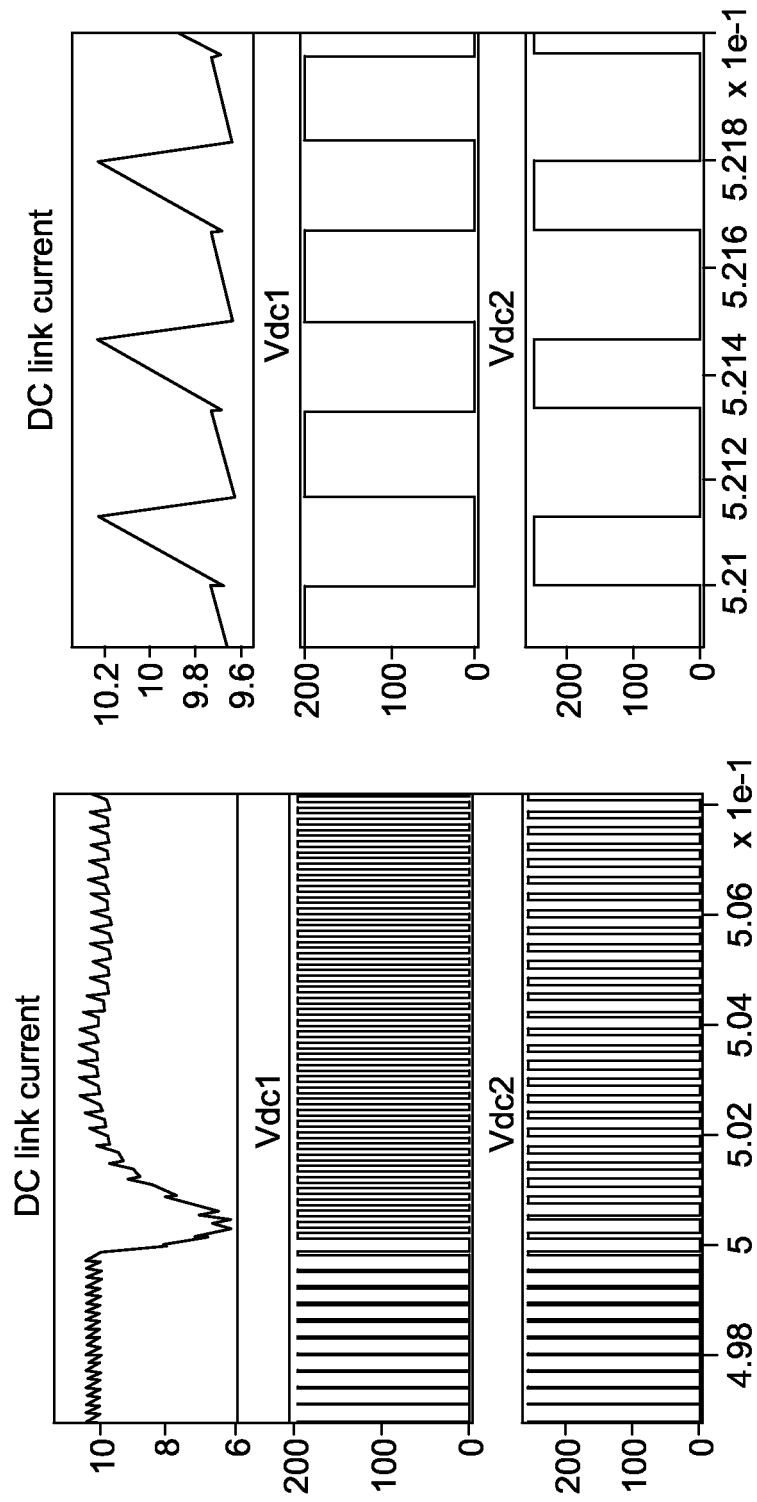

SYSTEM AND METHOD FOR POWER SHARING OF FRONT-END CONVERTERS WITHOUT COMMUNICATION LINK IN A MODULAR-STACKED DC TRANSMISSION SYSTEM

BACKGROUND

This invention relates generally to transmission of electrical power to sub-sea electrical equipment such as a motor driving a compressor/pump located far away from the shore, and more particularly to a system and method for sharing power among different source-side converter modules without a communication link in a transmission and distribution system that employs modular stacked DC (MSDC) technology for sub-sea applications.

Transmission of electrical power to oil and gas sub-sea electrical equipment often requires high power to be transmitted over long distances. Such a transmission is done at high voltages to reduce losses. At the receiving sub-sea end, the voltage is stepped-down and then distributed to the individual loads. Distribution distances are typically much shorter than the transmission distance.

Three phase 50/60 Hz AC power transmission and distribution is a mature technology. Using this technology, step-up transformers are used at the sending end to increase the voltage to transmission levels (e.g. 72 kV). At the subsea end, step down transformers are used to reduce the voltage to distribution levels.

AC transmission, although mature, provides technical challenges for applications where bulk power is transmitted over long cables. Due to cable capacitance, a significant amount of reactive power needs to be provided by the power source and carried by the cable. Capacitance causes charging current to flow along the length of the AC cable. Because the cable must carry this charging current in addition to the useful load current, the cable losses are high; the cables are overrated and expensive. Large reactive power requirements may trigger power system stability issues. The limitation of 50/60 Hz AC transmission and distribution can be alleviated by reducing the power transmission frequency (e.g. 16⅔ Hz). This reduces the reactive power requirement by the cable capacitance. However, this solution is at the expense of increase in size of magnetic components such as transformers. At high power levels, the size and weight penalty would be excessive.

Typically, multiphase booster pumps require electrically driven motors delivering a shaft power between 2 MW and 6 MW. Such pump clusters may require power on the order of 20 MW to be transmitted over 50 kms.

Further, sub-sea motors driving a gas compressor typically have a higher nominal power (e. g., in the order of 10 or 15 MW). As such, sub-sea compression clusters may be required to transmit a total power in the order of 50 to 100 MW over a distance of 100 or 200 km. The transmission of high power over a distance of more than 100 km and distributing the power sub-sea is very challenging with AC transmission and distribution systems because of the high charging currents and the high number of components involved in the distribution system.

In general, DC transmission can be achieved more efficiently over long distances than AC transmission. High voltage (HV) DC transmission typically requires the usage of power electronic converters in the transmission systems that are capable of converting between HVAC and HVDC. Each switch of the converter for conventional HVDC converter topologies is designed to handle high voltages. The converter nominal voltage may range from tens-of-kilovolts to hundreds-of-kilovolts, depending upon the application. Such switches are typically configured utilizing a plurality of series connected semiconductor devices (e.g., such as insulated gate bipolar transistors (IGBTs) and thyristors). Because of the size and the high number of components involved, conventional HVDC terminals are not well suited for sub-sea installations.

Power converters are also required on the load side of a power distribution system. Typically, a power converter in conjunction with a high voltage transformer is used to step down the voltage from the DC transmission level to the voltage level used in the power distribution system. The variable speed drive (VSD) of the sub-sea pump/compressor motor converts this distribution level voltage to variable frequency AC voltage required to run the motor over a wide range of speed.

Modular stacked DC converter architectures are well suited for sub-sea applications requiring transmission and distribution over long distances. Unlike other DC transmission options, wherein the dc transmission (link) voltage is controlled, i.e. maintained nearly constant, the dc transmission (link) current is controlled in a modular stacked dc converter. One MSDC architecture 10 is depicted in FIG. 1. The MSDC architecture gets its name from the fact that the architecture uses several dc-dc/ac-dc/dc-ac converter modules stacked and connected in series on the dc side, both at the sending end and at the receiving end of the transmission link such as depicted in FIG. 1.

The sending end/top-side converters 12 comprise a set of ac-dc converters 14, which draw power from the ac mains or grid 16. Each of these converters 14 is cascaded with a dc-dc converter 18. These dc-dc converters 18 are connected in series and they are controlled so as to regulate the current in the dc cable 20 connecting the top-side 12 to the sub-sea installation 22. It shall be understood that the sending-end ac-dc 14 and dc-dc converter 18 stages (shown explicitly in FIG. 1) can be replaced by a single ac-dc converter that combines the functions of both the stages. The sub-sea/receiving-end 22 also comprises several dc-dc converters 19 connected in series. Each of these converters 19 is cascaded with a dc-ac inverter/motor drive 24. These dc-dc converters 19 are controlled to regulate the dc link voltage to that required by the down-stream motor drive 24. It shall also be understood that the subsea dc-dc 19 and motor drive 24 (shown explicitly in FIG. 1) can also be replaced by a single dc-ac converter that combines the functions of both the stages. Although FIG. 1 depicts two-level converters used for the ac-dc, dc-dc and motor drive modules, it shall be understood that at high power levels, multi-level stacks will be used for these converter modules.

The sending end converters 12 may derive power from a single or multiple sources/generators 30 located in one place as illustrated for one embodiment in FIG. 2. According to another embodiment, the sending end converters 12 may derive power from several sources 30 that are located in places separated by large geographical distances such as depicted in FIG. 3. In both of these embodiments, there is a need to share the total load power between the different connected sources 30. According to one embodiment, a supervisory controller can be employed that will communicate the power to be delivered by each module, wherein each module is connected to one source 30. This approach requires communication lines between the controller and each module. Any failure of a corresponding communication link or the supervisory controller itself will undesirably shut down the entire system. System reliability is one of the critical features in sub-sea transmission and distribution systems; and such single point failures are not acceptable.

In view of the foregoing, there is a need to share the total load in a sub-sea transmission and distribution system among the front-end converters equally or proportional to their ratings in a manner that is not susceptible to single point communication link failures such as those exhibited by systems that employ a supervisory controller.

BRIEF DESCRIPTION

An exemplary embodiment of the present invention comprises a sub-sea power transmission/distribution network that includes a plurality of standard proven power converter building blocks on each of the power source side and the sub-sea load side, wherein the power source side converters and the sub-sea load side converters are each configured to provide a modular stacked dc converter architecture. The power source side converters are further configured to share the network load equally or in proportion to their individual power ratings based on corresponding linear/non-linear droop curves representative of link current magnitude data and average output voltage data of the power source side converters.

According to another embodiment, a power transmission and distribution system comprises:
a power source side;
a sub-sea load side; and
a plurality of power converters on each of the power source side and the sub-sea load side, wherein the power source side converters and the load side converters are each configured to provide a modular stacked dc converter architecture, and further wherein the power source side converters are configured to share the load equally or in proportion to their individual power ratings in the absence of a communication link between the power source side converters.

DRAWINGS

The foregoing and other features, aspects and advantages of the invention are apparent from the following detailed description taken in conjunction with the accompanying drawings in which like characters represent like parts throughout the drawings, wherein:

FIG. 9 illustrates changes in converter load sharing in response to load changes;

FIG. 10 illustrates converter steady state load sharing conditions subsequent to the load changes;

While the above-identified drawing figures set forth alternative embodiments, other embodiments of the present invention are also contemplated, as noted in the discussion. In all cases, this disclosure presents illustrated embodiments of the present invention by way of representation and not limitation. Numerous other modifications and embodiments can be devised by those skilled in the art which fall within the scope and spirit of the principles of this invention.

DETAILED DESCRIPTION

Power that is delivered to the loads in a sub-sea transmission and distribution system that employs a MSDC architecture may be derived either from one source, e.g. an ac grid or a generator located on the platform or from several generators that are separated by large geographical distances. In both cases, there is a need to share the total load in the sub-sea transmission and distribution system among the front-end converters equally or proportional to their ratings in a manner that is not susceptible to single point communication link failures, such as those exhibited by systems that employ a supervisory controller.

Figure 1:
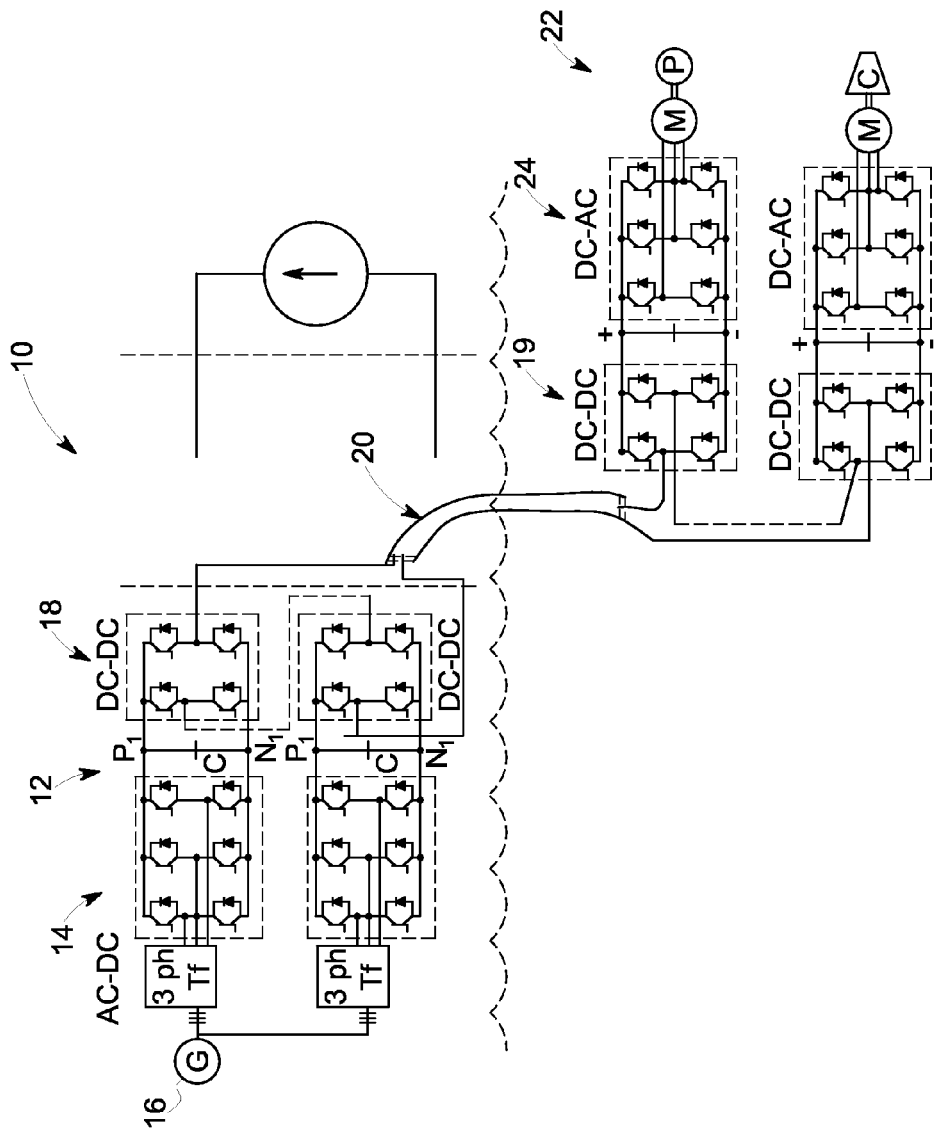
FIG. 1 is a simplified diagram illustrating a sub-sea power transmission/distribution system with modular stacked power converter building blocks on both the on-shore side and sub-sea side of the system according to one embodiment of the invention.
Figure 2:
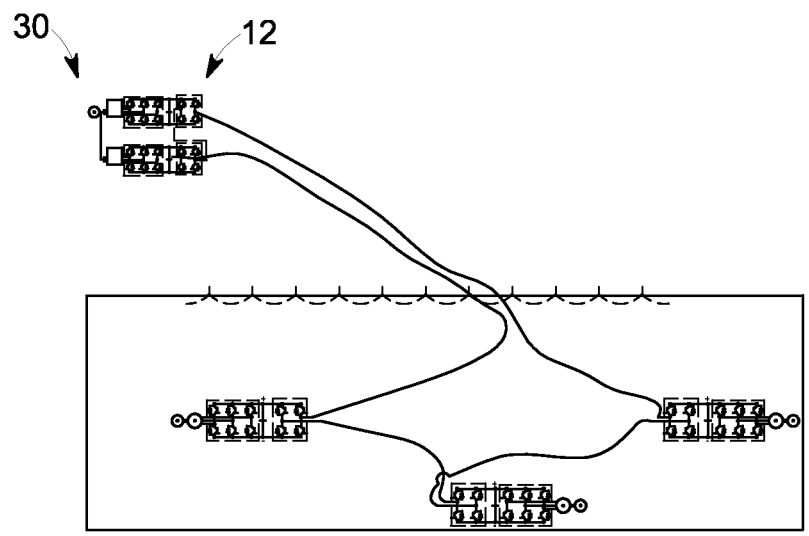
FIG. 2 illustrates an onshore converter configuration with onshore power sources in one location.
Figure 3:
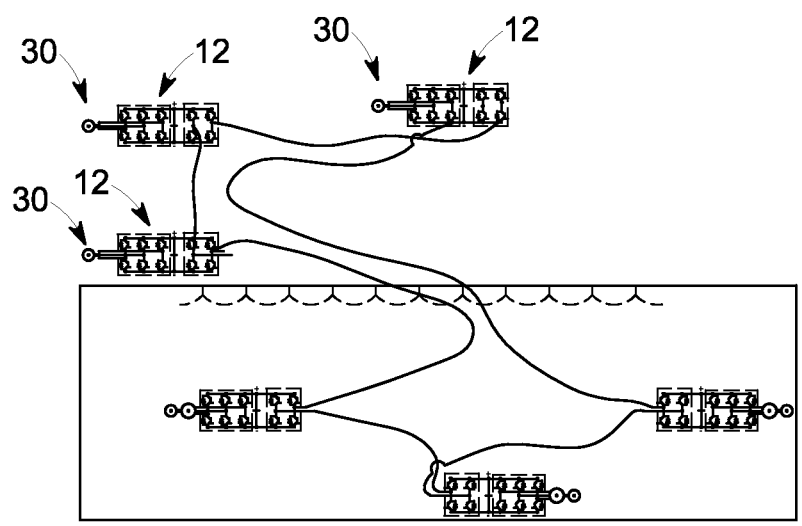
FIG. 3 illustrates an onshore converter configuration with onshore power sources in different geographical locations.
Figure 4:
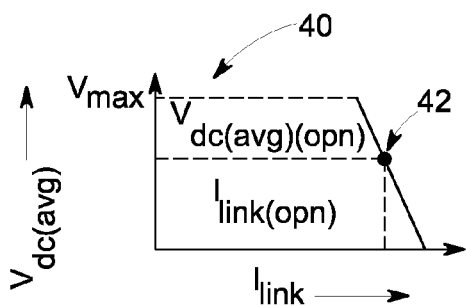
FIG. 4 is a graph illustrating a linear droop curve for converters having a common power rating.

The MSDC architecture comprises two sets of converters including sending end/top-side converters and receiving end/sub-sea converters, as stated herein. According to one embodiment, sharing power between different sending end converters 18 is accomplished by programming each of the sending end dc-side converters 18 with a droop curve 40 such as depicted in FIG. 4. In this regard, each sending end dc-side converter is programmable via integrated programmable software/firmware. According to one embodiment, each dc-side converter 18 comprises an integrated programmable controller that includes, for example, at least one of a CPU or a DSP and corresponding memory devices, such as RAM and/or ROM that may be programmable, such as EPROM/EEPROM devices. Programmable logic devices may also be employed to provide the requisite programmable control features. A particular dc-side converter 18 droop curve 40 is determined from the magnitude of the link current ($I_{link}$) flowing through the dc cable, such as dc cable 20 depicted in FIG. 1, and the average output voltage ($V_{dc(avg)}$) of the particular dc-side converter 18. The load shared by the particular converter 18 is then determined as the product of ($I_{link}$) and dc voltage $V_{dc}$ at the operating point 42, e.g. $V_{dc(avg)(opn)} * I_{link(opn)}$.

The sending end converters 18 in the MSDC system at no load will put out a very low voltage, just to supply the system losses. The link current will be the highest under these conditions. When the system load increases, the magnitude of link current decreases and the converters 18 shift to a new operating point delivering a higher voltage and thereby supplying an increased power to meet the load demand.

Figure 5:
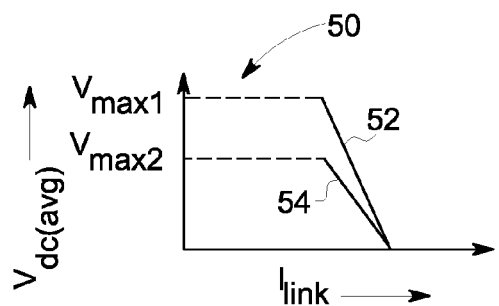
FIG. 5 is a graph illustrating linear droop curves for converters having power ratings that are different from one another.
Figure 14:
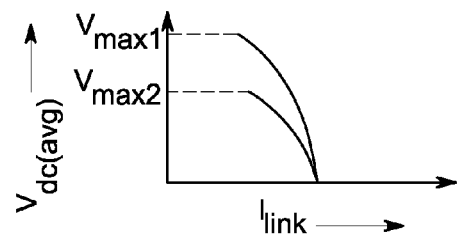
FIG. 14 is a graph illustrating non-linear droop curves for converters having power ratings that are different from one another.

According to one embodiment, a single droop curve 40 can be programmed in a local controller associated with each front end converter 18 of the same or substantially the same rating. The droop curve(s) can be either linear such as depicted in FIGS. 4 and 5 or non-linear such as depicted in FIGS. 11-14 according to particular embodiments. FIG. 4 is a graph illustrating a droop curve for converters 18 having a common power rating. Alternatively, for converters 18 of different power ratings contributing to the link current, the load can be shared proportional to their power ratings by using different droop curves such as depicted in FIG. 5 that illustrates linear droop curves 52, 54 for converters having power ratings that are different from one another. Non-linear droop curves such as depicted in FIG. 14 can also be employed for converters having power rating different from one another in another embodiment.

Figure 6:
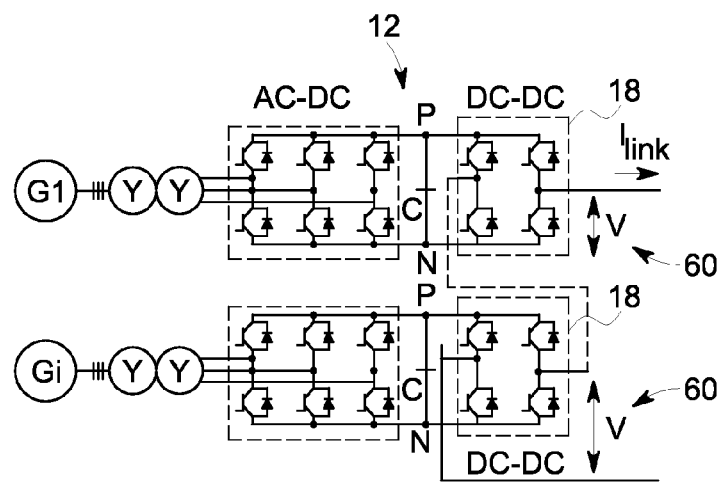
FIG. 6 illustrates load sharing by onshore converters according to one embodiment.

FIG. 6 illustrates sending end converters 12 configured to provide load sharing by corresponding onshore dc-side converters 18 according to one embodiment. Each dc-side converter 18 is programmed to generate an average output voltage 60 corresponding to its respective dc-side converter operating point.

Figure 7:
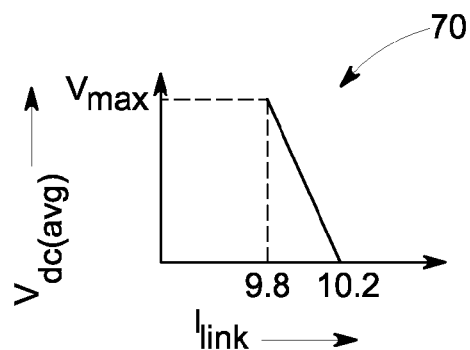
FIG. 7 depicts a droop curve for a power converter employed to simulate results of load sharing by onshore converters.

Load sharing between converters in the absence of a physical communication link has been demonstrated by the present inventors using computer simulations for a system comprising series connected sending end dc-dc converters 18 such as depicted in FIG. 6. Input voltages employed for this embodiment were 200 volts and 250 volts respectively. Droop characteristics 70 employed to simulate results of load sharing by the onshore converters 18 are depicted in FIG. 7. A three (3) kHz switching frequency was also employed to simulate the results.

Figure 8:
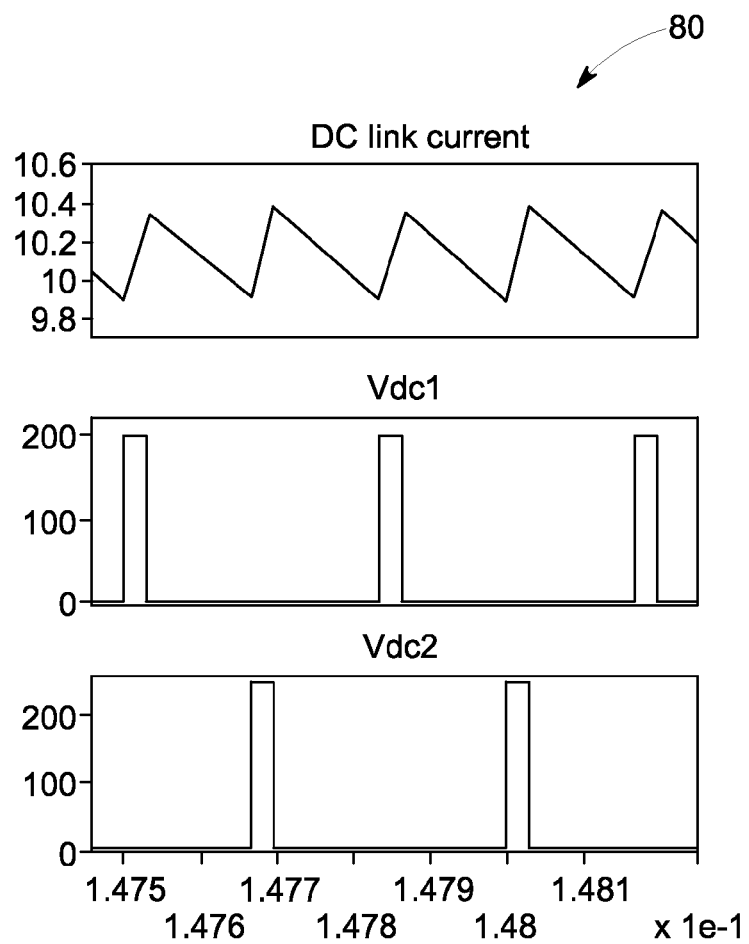
FIG. 8 depicts converter load sharing results based on the droop curve depicted in FIG. 7 according to one embodiment.
Figure 11:
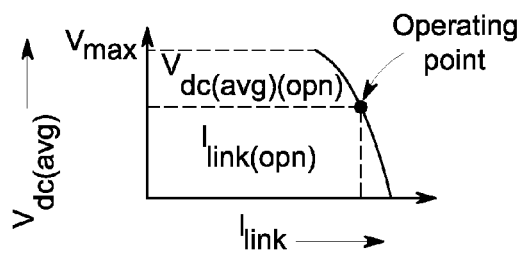
FIG. 11 is a graph illustrating a non-linear droop curve for converters having a common power rating.
Figure 12:
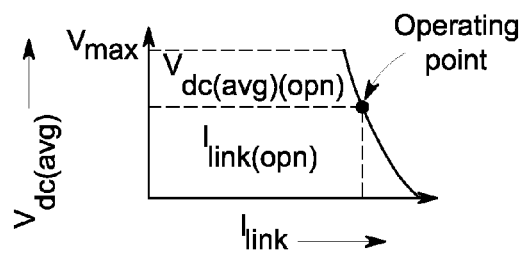
FIG. 12 is a graph illustrating another non-linear droop curve for converters having a common power rating.
Figure 13:
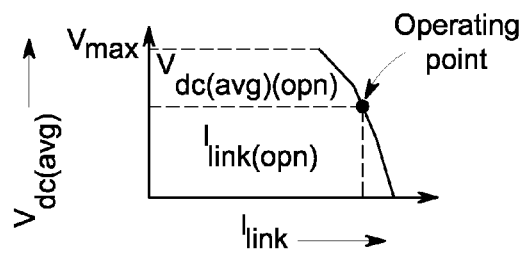
FIG. 13 is a graph illustrating yet another non-linear droop curve for converters having a common power rating.

FIG. 8 depicts dc-dc converter load sharing results 80 for the dc-dc converters 18 depicted in FIG. 6 based on the droop curve depicted in FIG. 7 according to one embodiment. These results are generated when the dc-dc converters 18 share a load power of 400 Watts, i.e. 200 Watts each. It can be seen that as the input voltage is higher for the second converter (250 V), the generated pulse width ($V_{dc2}$) is smaller than that corresponding to the first converter ($V_{dc1}$). Simulation results were obtained by filtering the switching ripple in the current prior to application of droop characteristics to determine the average output voltage.

FIG. 9 illustrates changes in dc-dc converter load sharing in response to load changes. More specifically, FIG. 9 depicts the effect as load power changes from about 400 W to about 2 kW. It can be seen the link current initially dips. The programmed droop causes the dc-dc converters 18 to increase their corresponding output voltages and hence support the increased load. FIG. 10 illustrates dc-dc converter steady state load sharing conditions subsequent to the load changes described herein with reference to FIGS. 8 and 9.

In summary explanation, exemplary embodiments of subsea power transmission/distribution network have been described herein that include a plurality of standard proven power converter building blocks on each of the power source side and the sub-sea load side, wherein the power source side converters and the sub-sea load side converters are each configured to provide a modular stacked dc converter architecture. The power source side converters are further configured to share the network load equally or in proportion to their individual power ratings based on corresponding droop curves representative of link current magnitude data and average output voltage data of the power source side converters.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A power transmission and distribution system comprising:
    a power source side;
    a load side; and
    a plurality of power converters on each of the power source side and the load side, wherein the power source side converters and the load side converters are each configured to provide a modular stacked dc converter architecture, wherein the connections, on the power source side converters, between the outputs of a first stacked DC-DC power source side converter and a second stacked DC-DC power source side converter are in series to the inputs of a first stacked DC-DC power load side converter and a second stacked DC-DC power load side converter, and further wherein the power source side converters are configured and programmed to share a load equally or in proportion to their individual power ratings, wherein the load sharing associated with each power source side converter is based on a corresponding link current versus average output voltage droop curve programmed therein, and to adjust a corresponding link current versus average output voltage droop curve operating point in response to a corresponding magnitude of link current and a corresponding average output voltage associated with the power source side converter.

2. The power transmission and distribution system according to claim 1, wherein each power source side converter comprises a dc-side.

3. The power transmission and distribution system according to claim 2, wherein each dc-side converter is an independently programmable converter, such that each dc-side converter generates an output voltage in response to corresponding droop curve data programmed therein.

4. The power transmission and distribution system according to claim 3, wherein the output voltage corresponds to a droop curve operating point corresponding to each dc-side converter.

5. The power transmission and distribution system according to claim 2, wherein the modular stacked dc converter architecture comprises at least two dc-side converters sharing a common operating point.

6. The power transmission and distribution system according to claim 2, wherein the modular stacked dc converter architecture comprises at least two dc-side converters that do not share a common operating point.

7. The power transmission and distribution system according to claim 2, wherein the modular stacked dc converter architecture comprises at least two dc-side converters having a common power rating.

8. The power transmission and distribution system according to claim 2, wherein the modular stacked dc converter architecture comprises at least two dc-side converters having power ratings that are different from one another.

9. The power transmission and distribution system according to claim 1, wherein the power source side converters are further configured and programmed to operate independently of each other.

10. The power transmission and distribution system according to claim 1, wherein the load side is a sub-sea load side.

* * * * *